United States Patent [19]

Simpson

[11] 3,927,845

[45] Dec. 23, 1975

[54] TAPE HANDLING MEANS

[76] Inventor: Ralph E. Simpson, 2445 N. Highland Road, Upland, Calif. 91786

[22] Filed: Feb. 19, 1974

[21] Appl. No.: 443,390

[52] U.S. Cl. ................ 242/68.3; 403/315; 403/322

[51] Int. Cl.².................... B65H 17/02; F16G 11/00

[58] Field of Search .............. 242/68.3, 72, 210, 55; 403/315, 321, 322, 230

[56] References Cited

UNITED STATES PATENTS

| | | | |
|---|---|---|---|
| 1,531,002 | 3/1925 | Grondahl | 242/129.7 |
| 2,983,531 | 5/1961 | Moro | 242/68.3 X |
| 3,294,337 | 12/1966 | Jacob | 242/68.3 |
| 3,596,846 | 8/1971 | Johnston | 242/68.3 |

*Primary Examiner*—Leonard D. Christian
*Attorney, Agent, or Firm*—John H. Crowe; Jess M. Roberts

[57] ABSTRACT

A system for automatically unwinding paper tape from a roll and feeding it to the output punch of a tape justifying computer. A 14-inch roll of tape without a reel is mounted upright on a hub on the outer wall of a soundproof housing enclosing the output punch. A pair of manually operable retainer members on the end face of the hub swing between inner release positions and outer effective positions to hold the tape roll in place. A roller on a pivoted arm rides on the tape roll and the traveling tape from the roll is turned 90° in direction to a tape drive on the same housing wall, the tape drive feeding the tape to the tape punch inside the housing. The housing comprises a bottom wall and a separate removable box-like shell. The tape punch engages locating pins on the bottom wall and the shell interlocks with the bottom wall in proper relationship thereto for positioning the roll of tape and the tape drive on the housing shell accurately relative to the tape punch inside the housing.

5 Claims, 8 Drawing Figures

TAPE HANDLING MEANS

BACKGROUND OF THE INVENTION

This invention relates to a system for feeding paper tape to a high-speed tape punch of the type used in newspaper composing rooms as the output punch of a justifying computer.

More particularly, the invention relates to such a system which includes; means to mount a roll of paper tape; a tape drive responsive to the high-speed tape punch to feed the tape to the punch; and means to route the traveling tape from the tape roll to the tape drive. A tape feeding system of this general type is disclosed in Nichols et al., U.S. Pat. No. 3,561,691, entitled Tape Unwinding Means, issued Feb. 9, 1971, which patent is hereby incorporated into the present disclosure by reference.

Because a high-speed tape punch is inherently very noisy and consequently irritating to personnel in the same environment, it is highly desirable to enclose the tape punch in a suitable compact sound-deadening housing. It is also highly desirable to use a 14-inch roll of paper tape instead of an 8-inch roll, because the larger roll holds 3 times as much tape as the smaller one, and can be purchased at as much as 10 percent saving in cost. Unfortunately, however, there is not enough room for a 14-inch roll of tape in a sound-proof housing that is suitably compact.

SUMMARY OF THE INVENTION

An important object of the present invention is to permit the use of 14-inch rolls of tape in a tape feeding system wherein the tape punch is enclosed in a sound-insulating housing that is too compact to enclose such a large roll of tape. This object is attained in the present invention by providing hub means on the outer wall of the housing to receive a 14-inch roll of tape and by further providing means to route the tape to a tape drive that is mounted on the same outer wall.

Another important object of the invention is to provide means for retaining 14-inch roll of raw tape on the hub, thereby avoiding the necessity of employing a conventional reel with opposite side members for holding the tape roll on the hub. For this purpose, a pair of retainer members are pivotally mounted on the end face of the hub to swing between inner release positions within the circumference of the hub and outer effective positions that extend outside the circumference of said hub to block the removal of a tape roll therefrom. The problem of preventing the outer loops of tape on such an exposed tape roll from slipping sideways from the roll, hereinafter called unraveling, is solved by a roller that rides on the upper periphery of the tape roll, the roller being carried by an arm that is pivoted to the external housing wall. Routing of the traveling tape to the tape drive is accomplished by means including a tape guide that changes the direction of travel of the tape by 90°.

A further object of the invention is to provide a sound-proof housing for the tape punch that may be completely disassembled for complete access to its interior and incorporates safeguards to make sure that precise predetermined spatial relationships between the internal tape punch and the external components of the system will be maintained in the reassembling of the housing. To this end the housing comprises a bottom wall or base and a separate box-like shell that may be simply lifted away from the base. Suitable locating pins interlock the tape punch with the housing base for accurate positioning of the tape punch on said housing base, and suitable means accurately interlock the shell of the assembled housing with the base to insure that the hub, tape drive and related components on the outer wall of said housing are in precisely correct positions relative to the tape punch inside the housing.

The various features and advantages of the invention may be understood from the following detailed description of the preferred embodiment thereof, taken with the accompanying drawings.

DESCRIPTION OF THE PREFERRED EMBODIMENT

Figures 1, 2, 8:
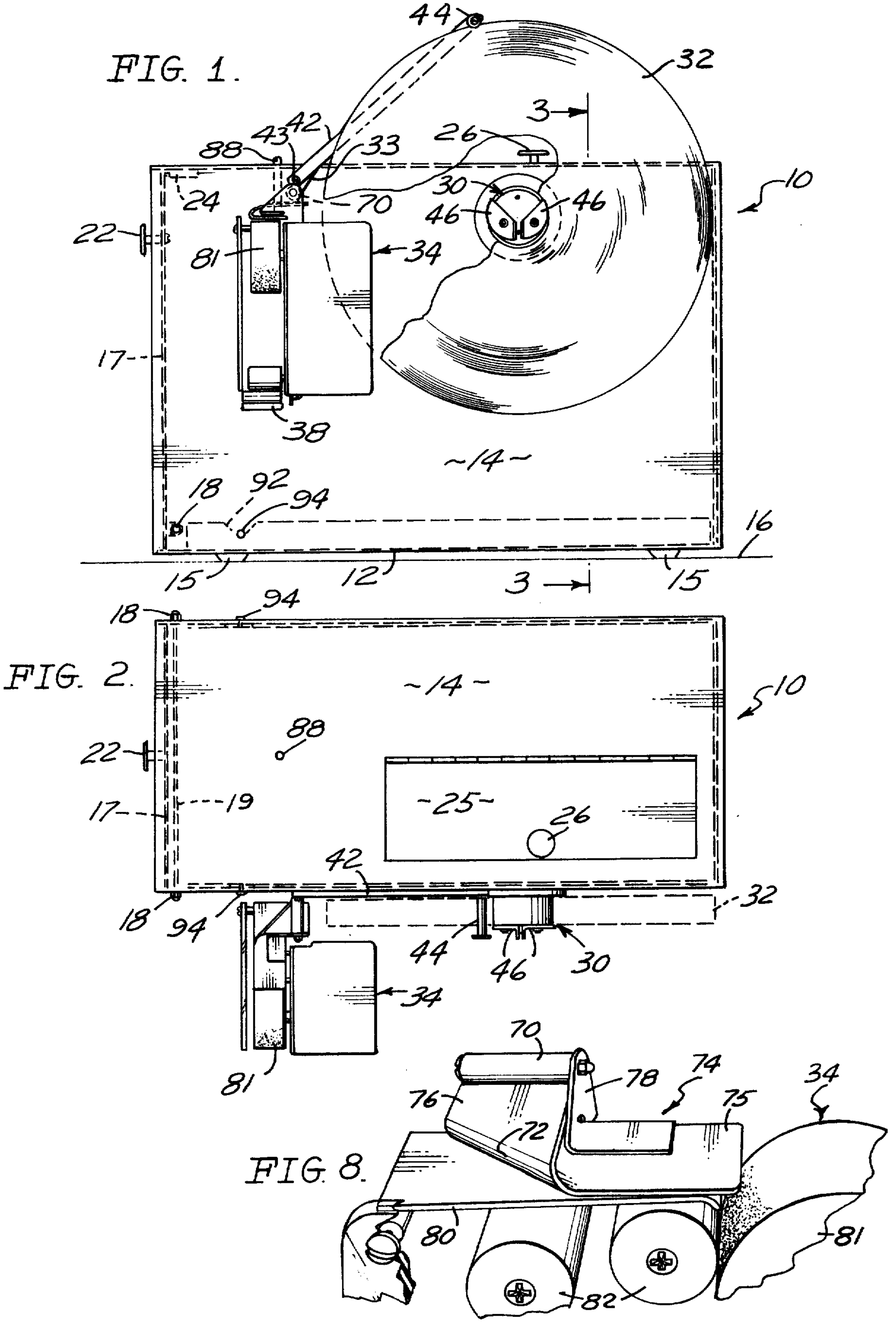
FIG. 1 is a side elevation of the presently preferred embodiment of the invention.
FIG. 2 is a top plan view of the embodiment.
FIG. 8 is an enlarged perspective view of a guide for routing tape from a roll on said hub to a tape drive mounted on said housing.
Figure 3:
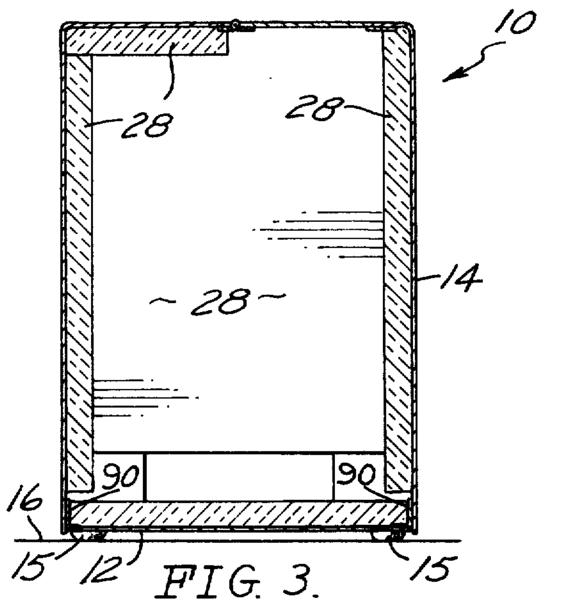
FIG. 3 is a vertical transverse section of the sound-proof housing, taken along line 3—3 of FIG. 1.

In the preferred embodiment of the invention illustrated by the drawings, all of the working parts of the computer tape punch supply system are mounted on or in a housing, generally designated 10, which comprises a base or bottom wall 12, together with a box -like shell 14 which is normally removably mounted on the base. In the construction shown, the base 12 has four rubber pads 15 to support the housing on a suitable horizontal surface, for example the surface 16 of a counter or table.

The front wall of the shell 14 is in the form of a door 17 that permits free access to the interior of the housing and is pivotally mounted on a crossrod 19 extending outwardly through the two opposite side walls of the shell 14 and held fast at its outer ends by means of a pair of nuts 18 (see FIGS. 1 and 2). The door 17 has a knob 22 and is normally held in closed position by a magnetic latch 24 mounted near the front of the housing (see FIGS. 1 and 4). The housing also has a smaller door 25, with a knob 26, on its top wall for access to the interior of the housing in the region of an 8-inch roll of paper tape (not shown) in the housing in the event it is desired to employ such an 8-inch roll of tape.

All of the interior walls of the housing 10 are provided with layers 28 of thick sound-insulating material which may, for example, consist essentially of a suitalc foamed plastic material or ordinary duct board comprising a layer (preferably ⅝ inch thick) of fiberglass faced with thin sheet (preferably 0.005 inch thick) aluminum.

Figure 4:
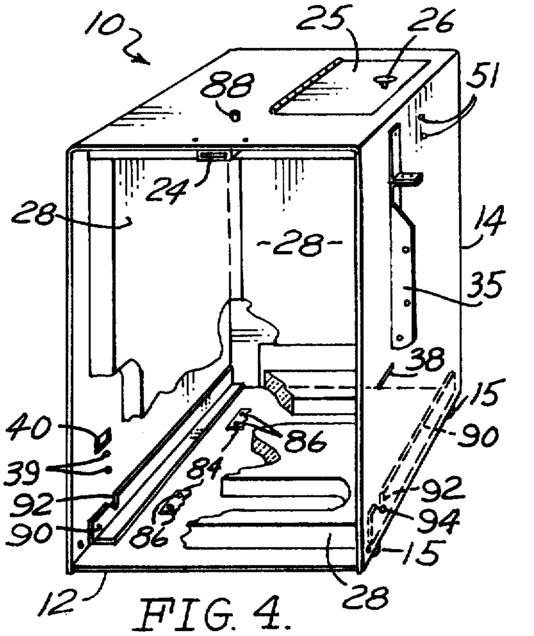
FIG. 4 is a perspective view of the housing with its front door removed.

The components of the illustrated tape supply system include : hub means generally designated 30, on the exterior of the right sidewall (as seen in FIG. 4) of the housing shell 14 for mounting a roll 32 of tape 33; and a tape drive, generally designated 34, that is releasably mounted on a bracket 35 (FIG. 4) on the same sidewall of the housing shell for feeding the tape to a high-speed tape punch (not shown) positioned inside the housing on base 12. The tape roll 32 may be a 14-inch roll, as illustrated, or may be a smaller 8-inch roll. The tape drive 34, which is fully disclosed in the previously-mentioned U.S. Pat. No. 3,561,691, feeds the tape 33 to the tape punch through a slot 38 (FIG. 4) in the right sidewall of the housing shell and the tape punch, in turn, feeds the punched tape to the exterior of the housing through a slot 40 in the left sidewall of the housing shell. A suitable device (not shown) for winding the punched tape passing through slot 40 can be affixed to the outside of said left sidewall in the proper position for receiving this tape if desired. A pair of holes 39 are provided in said left sidewall (just below slot 40) for use in the fastening of such a device to the housing shell in a preferred arrangement of cooperating parts in accordance with this invention.

As best shown in FIG. 1, an arm 42 mounted on the outer wall of the housing shell 14 by a pivot 43 carries a roller 44 that rides on the upper periphery of the tape roll 32, and a feature of the invention is that the hub means 30 in combination with the arm and roller permits the mounting of the tape roll in upright position without the necessity of first providing the tape roll with the usual reel having side members to confine it. It has been found that with the tape 33 maintained under normal tension as it is pulled from tape roll 32, the tape roll keeps its shape and has no tendency to unravel.

Figure 7:
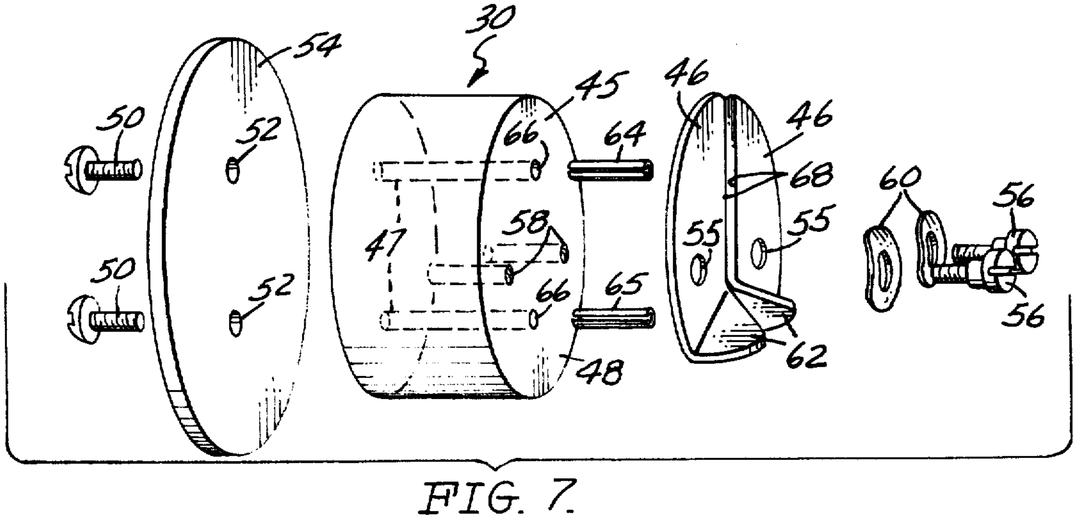
FIG. 7 is an exploded perspective view of the hub means.

As shown in FIG. 7, the hub means 30 comprises a fixedly mounted hub body 45 and a pair of retainer in the form of levers comprising plates of generally semi-circular configuration members 46 that are pivotally mounted on the end face 48 of the hub body. A pair of screws 50 inside the housing shell extend through corresponding holes 51 (FIG. 4) in the sidewall of the housing and through smooth bores 52 in a base disc 54 on the outer face of the housing wall. The screws 50 thread into corresponding threaded bores 47 on the inner face of the hub body 45.

The two retainer members 46 have corresponding bores 55 to receive corresponding shoulder screws 56 that are screwed into corresponding threaded bores 58 in the end face 48 of the hub body. The two shoulder screws 56 are provided with corresponding compression washers 60 that continuously press the retainer members 46 against the end face 48 of the hub body and thus cause the two retainer members to be frictionally held at whatever positions to which they may be moved. Preferably, the surfaces of the retainer members 46 are coated with a suitable plastic such as Teflon, to prevent undue frictional resistance to manual rotation of the two retainer members. As shown in FIG. 7, the lower ends of the two retainer members 46 are bent to form finger pieces 62 to facilitate manipulation of the retainer members.

Two spaced stop pins 64 and 65 are mounted in corresponding bores 66 in the end face 48 of the hub body 45 (bores 66 being in line and continuous with bores 47), the two stop pins being spaced apart on a vertical diameter of the end face. At the release positions of the two retainer members 46 shown in FIG. 5, inner straight edges 68 of the retainer members abut the upper stop pin 64 from opposite sides, the two retainer members then lying wholly inside the circumference of the hub body to avoid interference with movement of tape roll 32 onto or off of the hub. On the other hand, at the effective positions of the two retainer members 46 shown in FIG. 6, the two finger pieces 62 of the retainer members abut the lower stop pin 65 with substantial portions of the members extending beyond the circumference of the hub body to cooperate with the base disc 54 to confine a tape roll on the hub body and keep the roll from rubbbing on the adjacent wall of housing 10.

It is important to note that the semi-circular retainer levers 46 rotate on axes that are substantially parallel with the axis of the hub body so that any force applied to the retainer levers at their effective positions by the roll of tape on the hub is perpendicular to the plane of rotation of the retainer levers and therefore does not tend to urge the retainer levers toward their release positions.

It is apparent that each of the retainer levers 46 has a relatively long latch arm to retain a roll of tape and has a shorter operating arm that is formed with a finger-piece 62 in the form of a flange. The two stop pins 64 and 65 define a diametrical line of the end face of the hub body that divides the end face into two halves, and each of the retainer levers is confined to one of the two halves. The two latching arms of the retainer levers extend toward one end of the diametrical line, and the operating arms extend toward the other end of the diametrical line.

By virtue of this arrangement, the two latch arms of the levers diverge from the diametrical line at their effective positions and confront each other across the diametrical line at their release positions. On the other hand, the operating arms of the retainer levers diverge from the diametrical line at the release positions of the two levers and confront each other across the diametrical line at the effective positions of the two levers. In effect, the stop pin 64 spaces the two latch arms of the levers apart at the release positions of the levers, and the stop pin 65 spaces the two operating arms apart at the effective positions of the two levers. This arrangement makes it possible for the operator to return the two retainer levers from their release positions shown in FIG. 5 to their effective positions shown in FIG. 6 by merely using a thumb and forefinger to pinch the two finger flanges 62 together.

From the periphery of the tape roll 32, the tape 33 extends under a guide roller 70 that forms the tape into an angle, the upper leg of the angle extending to the periphery of the tape roll 32 tangentially thereof, and the lower leg of the angle extending substantially horizontally to the curved edge 72 of a tape guide, generally designated 74, that changes the direction of the traveling tape 90° to feed the tape to the previously mentioned tape drive 34.

As best shown in FIG. 8, the tape guide 74 comprises a metal strap 75 having an end portion 76 that is folded over to form the smooth curved edge 72 with the curved edge extending at an angle of 45 degrees relative to the plane of rotation of the tape roll 32. In the construction shown, the guide roller 70 is carried by a bracket 78 that is fixedly mounted on the upper side of the metal strap 75. As shown in FIg. 8, a second metal strap 80 is positioned close to the underside of the metal strap 75 to support the traveling tape above a pair of guide rollers 82 of the tape drive 34 as the tape approaches a power actuated drive roller 81 of the tape drive.

It is essential that the various working components of the tape supply system be correctly and precisely positioned relative to each other during operation of the system and especially so since the tape travels at relatively high speed. Since the tape punch is necessarily removable from the base 12 of the housing and since the housing shell 14 that carries the remaining components of the system is removable from the base of the housing, safeguards are required to insure correct positioning of the tape punch when it is returned to the base, and safeguards are required also to insure that the housing shell 14 is always assembled in precisely correct position relative to the base. The safeguards afforded by the present invention will now be described.

As may be seen in FIG. 4, portions of the base 12 of the housing are free from the sound insulating layers 28 to provide firm support surfaces for the tape punch. FIG. 4 shows fragments 84 of the base structure of the tape punch with two pairs of holes therein for snug fit over corresponding pairs of locating pins 86 on the base 12 of the housing to insure that the tape punch is accurately positioned each time it is returned to the interior of the housing.

When the tape punch is correctly positioned by the locating pins 86, the control switch (not shown) of the tape punch is aligned with a spring-loaded plunger 88 that is slidingly mounted in a protruding position in the top wall of the housing. The tape punch may be started or stopped by merely depressing the plunger 88. The tape punch housing 10 is particularly adapted to receive a punch mechanism manufactured by Teletype Corporation of Skokie, Illinois, sold under the name "High-Speed Tape Punch Set (BRPE)," and referred to by those skilled in the art as the BRPE punch.

With assurance that the tape punch is always accurately positioned on the base 12, there remains the problem of insuring correct location of the housing shell 14 with respect to the housing base 12 for correct spatial relationship of the components on the housing shell with the tape punch inside the housing. For this purpose, the housing base 12 is provided with a pair of longitudinal guide shoulders and the housing shell 14 is provided with a second cooperating pair of longitudinal guide shoulders, with one of the pairs of guide shoulders straddling the other pair in a slidable manner to insure correct longitudinal alignment of the housing shell relative to the housing base.

In the construction shown in FIG. 4, the longitudinal guide shoulders of the housing base 12 are the outer surfaces of upright flanges 90 of a pair of longitudinal angle irons which are fixedly mounted on the housing base. The cooperating longitudinal guide shoulders of the housing shell 14 are the corresponding inner surfaces of the two opposite sidewalls of the housing shell, which inner surfaces slidingly straddle the pair of flanges 90. By virtue of this arrangement, the housing shell 14 may straddle the flanges 90 at any random longitudinal position of the housing shell relative to the base and then the housing shell may be slid longitudinally relative to the base, with the cooperating pairs of longitudinal guide shoulders insuring accurate longitudinal alignment of the housing shell with the base throughout the range of movement of the housing shell. The only further requirement is suitable index means to determine the correct longitudinal position of the housing shell relative to the housing base.

In this particular embodiment of the invention, the index means comprises V-shaped recesses, or notches, 92, in the two flanges 90, respectively, and corresponding index pins 94 extending inwardly from the bottom marginal portions of the two opposite sidewalls of the housing shell. The index pins 94 are so positioned that when they are out of register with the V-shaped notches 92, they rest on the upper edges of the flanges 90 while the flanges function to maintain the correct horizontal alignment of the housing shell. To assemble the housing shell to the housing base, the shell is first telescoped over the pair of longitudinal flanges 90 of the base at some random longitudinal position of the housing shell to cause the two index pins 94 to rest on the upper edges of the longitudinal flanges. The housing shell is then slid manually to cause the index pins to ride on the upper edges of the flanges 90 until the index pins drop into the V-shaped recesses 92 and thereby complete the procedure for accurately locating the housing shell on its base.

Figure 5:
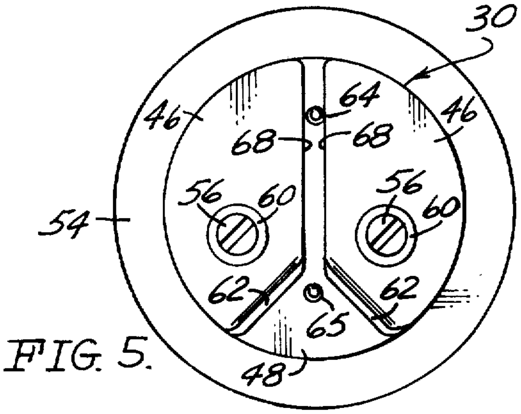
FIG. 5 is an elevation of the outer end of the hub means, showing two retainer members at inner release positions thereon.
Figure 6:
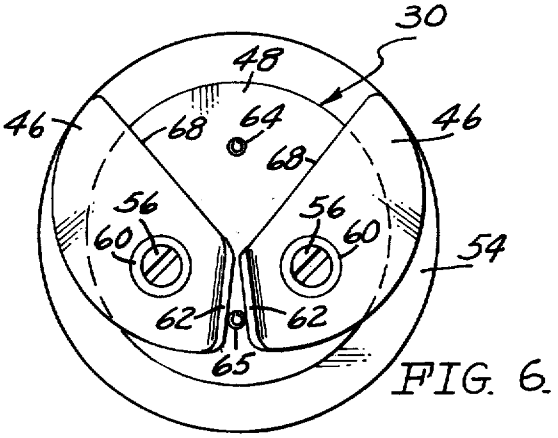
FIG. 6 is a similar view, but showing the two retainer members swung to outer effective positions to hold a roll of tape on the hub means.

The manner in which the described computer tape supply system serves its purpose may be readily understood from the foregoing description. To mount a 14-inch roll of tape on the hub means 30, the two retainer members 46 on the end face of the hub are manually positioned as shown in FIG. 5, so that a new roll of tape may be readily telescoped onto the hub body 45. The two finger pieces 62 are then manually brought together against the lower stop pin 65 to cause the two retainer members to swing outwardly, as shown in FIG. 6, thereby confining the tape roll against the base disc 54 of the hub means. The arm 42 is then swung into the position shown in FIG. 1 to bring the roller 44 to rest on the upper periphery of the tape roll. Finally, the end of the tape is loosened from the roll and is threaded through the various guides to the tape punch inside the housing and beyond to the exterior of the housing. The operator may then depress the plunger 88 to close the switch on the tape punch to initiate the tape punching operation.

Whenever desired, the door 17 of the housing may be opened to permit threading of the tape 33 through the punching mechanism (punch block) of the tape punch in said housing. Also, the housing shell 14 may be simply lifted away from the base 12 whenever complete access to the interior of the housing is desired. In returning the housing shell to its base, the shell is positioned in a random manner with its sidewalls straddling the longitudinal guide flanges 90 of the housing base, and with the index pins 94 resting on the upper edges of the flanges. The shell 14 is then slid in the direction to cause the index pins 94 to fall into the V-shaped recesses 92 and thus assure correct and precise positioning of the housing shell relative to the base. Preferably the housing shell and base are designed for snug-fitting contact between the sidewalls of the former and the guide flanges on the latter to prevent rattling of the housing during operation of the tape punch.

It is emphasized that the tape supply system has broader use potential than indicated by the foregoing specification and can be employed in any capacity for which its unique character and capabilities suit it. Finally, it is emphasized that the scope of the present invention includes all variant forms thereof encompassed by the language of the following claims.

What we claim is:

1. Hub means for supporting a wound roll of elongated materia on a support structure, comprising:

a hub body adapted for mounting at one end on said support structure to telescopically receive said wound roll, said hub body having an outer end face; and two retainer levers pivotally mounted on said end face of the hub body to rotate on axes that are substantially parallel to the axis of the hub body, one arm of each retainer lever being a latch arm and the other arm being an operating arm, the two retainer levers being pivotally movable between effective positions extending beyond the outer circumference of the hub body to retain the wound roll on the hub body and retracted release positions inside the outer circumference of the hub body, the two retainer levers lying on opposite sides of a diametrical line on said outer end face of the hub body with the two latch arms of the levers extending toward one end of the diametrical line and the two operating arms extending toward the other end of the diametrical line, the latch arms of the retainer levers confronting each other across the diametrical line at the release positions of the levers and diverging from the diametrical line at the effective positions of the levers, the operating arms confronting each other across the diametrical line at the effective positions of the levers and diverging from the diametrical line at the release positions of the levers, the operating arms of the levers being equipped with respective fingerpieces that may be squeezed together between the thumb and forefinger of the operator to swing the levers from their release positions to their effective positions.

2. Hub means as set forth in claim 1 in which each retainer lever is a plate of generally semi-circular configuration with an end of the plate bent to form the fingerpiece of the operating arm of the lever.

3. Hub means as set forth in claim 1 which includes two spaced stops on said diametrical line, one of the stops spacing the latch arms of the levers apart at the release positions of the levers, the other stop spacing the operating arms apart at the effective positions of the levers.

4. Hub means as set forth in claim 1 which includes means at the pivots of the two levers pressing the two levers against the end face of the hub body to cause the two levers to yieldingly maintain whatever positions at which they may be manually placed.

5. Hub means as set forth in claim 1 in which the inner faces of the two levers are coated with a plastic material having a low coefficient of friction with respect to the outer end face of the hub body.

* * * * *